United States Patent
Yi et al.

(10) Patent No.: US 9,924,534 B2
(45) Date of Patent: Mar. 20, 2018

(54) METHOD AND APPARATUS FOR CONTROLLING MONITORING TIMING IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/784,215

(22) PCT Filed: Apr. 14, 2014

(86) PCT No.: PCT/KR2014/003194
§ 371 (c)(1),
(2) Date: Oct. 13, 2015

(87) PCT Pub. No.: WO2014/171683
PCT Pub. Date: Oct. 23, 2014

(65) Prior Publication Data
US 2016/0081111 A1     Mar. 17, 2016

Related U.S. Application Data

(60) Provisional application No. 61/811,790, filed on Apr. 14, 2013, provisional application No. 61/898,451, (Continued)

(51) Int. Cl.
*H04W 72/12* (2009.01)
*H04L 5/00* (2006.01)
(Continued)

(52) U.S. Cl.
CPC ......... *H04W 72/1289* (2013.01); *H04L 5/001* (2013.01); *H04L 5/005* (2013.01);
(Continued)

(58) Field of Classification Search
CPC ........... H04W 72/1289; H04W 76/048; H04W 8/005; H04L 5/001; H04L 5/005;
(Continued)

(56) References Cited

U.S. PATENT DOCUMENTS 8,934,391 B2 * 1/2015 Yi .................... H04W 72/042
370/310
2010/0260052 A1  10/2010 Cho et al.
(Continued)

FOREIGN PATENT DOCUMENTS

WO   WO 2012/139404 A1   10/2012
WO   WO 2013/025069 A1   2/2013

OTHER PUBLICATIONS

Ericsson et al., "On EPDCCH operation for NCT," 3GPP TSG-RAN WG1 #72bis, R1-131449, Chicago, USA, Apr. 15-19, 2013, (downloaded by EPO on Apr. 7, 2013), XP050697411, 1 page.
(Continued)

*Primary Examiner* — Hassan Kizou
*Assistant Examiner* — Roberta A Shand
(74) *Attorney, Agent, or Firm* — Birch, Stewart, Kolasch & Birch, LLP

(57) ABSTRACT

A method for and apparatus for controlling monitoring timing in a wireless communication system is provided. A wireless device may acquire information including a monitoring subframe configuration, which is set for a first subframe in which at least one of control and reference signal is present, and a second subframe in which the control and reference signal are not present within a radio frame; determine monitoring subframes of a cell based on the informa-
(Continued)

tion; and control to monitor the first subframe and the second subframe according to the monitoring subframes.

11 Claims, 9 Drawing Sheets

Related U.S. Application Data filed on Oct. 31, 2013, provisional application No. 61/955,194, filed on Mar. 18, 2014.

(51) Int. Cl.
*H04L 5/14* (2006.01)
*H04W 8/00* (2009.01)
*H04W 76/04* (2009.01)

(52) U.S. Cl.
CPC .......... *H04L 5/0053* (2013.01); *H04L 5/0098* (2013.01); *H04L 5/1469* (2013.01); *H04W 8/005* (2013.01); *H04W 76/048* (2013.01); *H04L 5/0048* (2013.01); *H04L 5/0073* (2013.01)

(58) Field of Classification Search
CPC ... H04L 5/1469; H04L 5/0048; H04L 5/0053; H04L 5/0073; H04L 5/0098
See application file for complete search history.

(56) References Cited

U.S. PATENT DOCUMENTS

| 2012/0294203 | A1 | 11/2012 | Koorapaty et al. | |
|---|---|---|---|---|
| 2013/0044664 | A1 | 2/2013 | Nory et al. | |
| 2013/0250882 | A1* | 9/2013 | Dinan | H04W 72/0426 370/329 |
| 2013/0301566 | A1* | 11/2013 | Wei | H04W 72/048 370/329 |
| 2014/0038598 | A1* | 2/2014 | Ren | H04W 48/16 455/434 |
| 2014/0134993 | A1* | 5/2014 | Kwak | H04W 52/0206 455/418 |

OTHER PUBLICATIONS

LG Electronics, "Handling the Conflict of PSS/SSS and DM-RS in NCT," 3GPP TSG RAN WG1#72, R1-130250, St Julian's, Malta, Jan. 28-Feb. 1, 2013, (downloaded by EPO on Jan. 18, 2013), XP050663382, 6 pages.

ZTE, "Considerations on NCT," 3GPP TSG-RAN WG1 Meeting #72bis, R1-131048, Chicago, USA, Apr. 15-19, 2013, (downloaded by EPO on Apr. 6, 2013), XP050697016, 2 pages.

* cited by examiner

[Fig. 1]
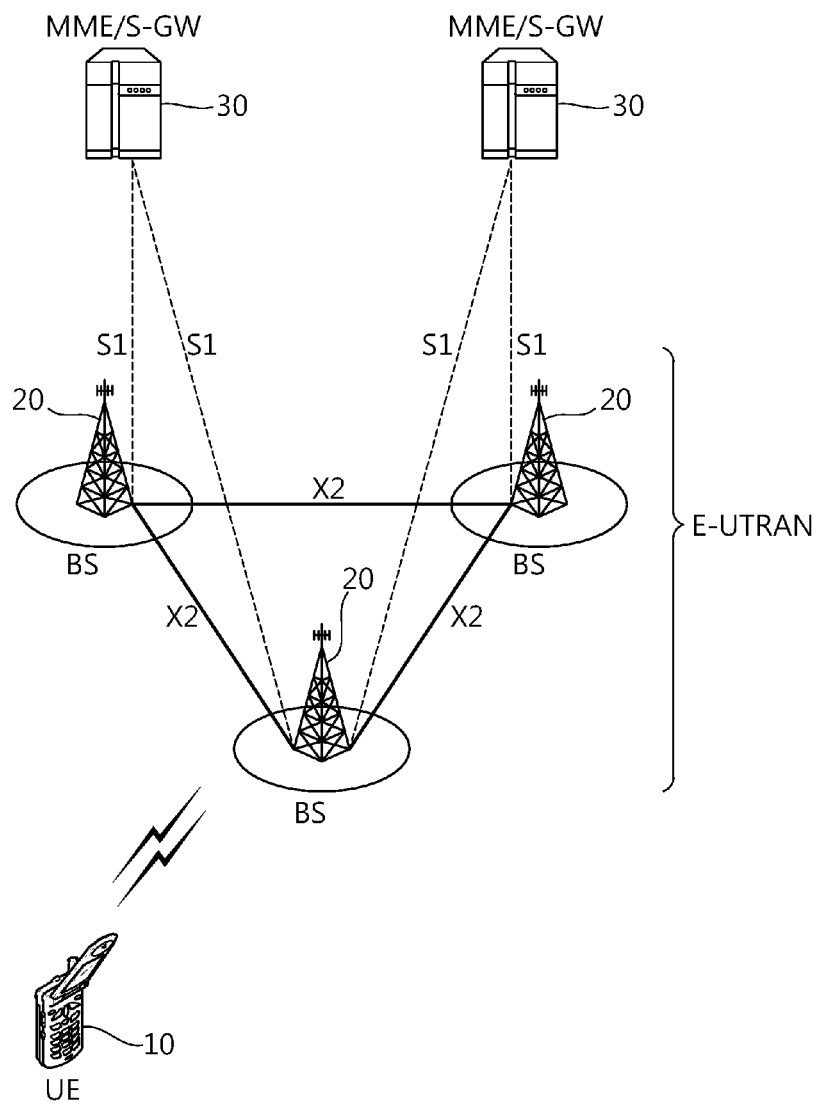

[Fig. 2]
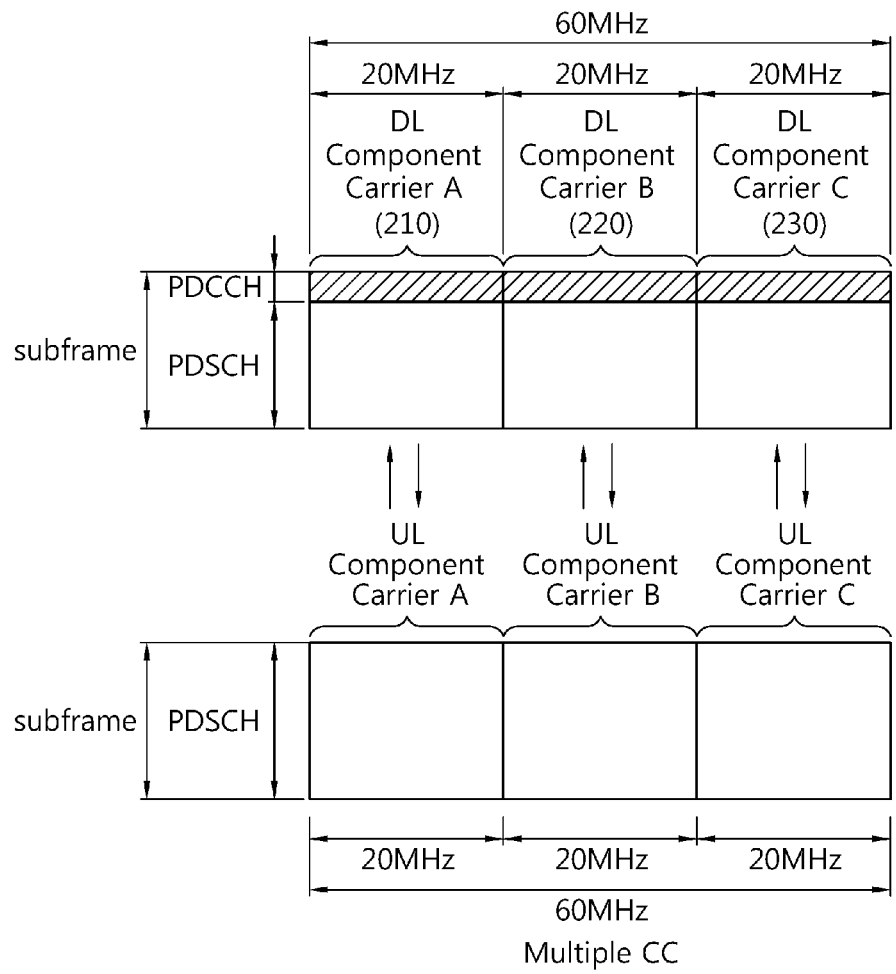
[Fig. 3]
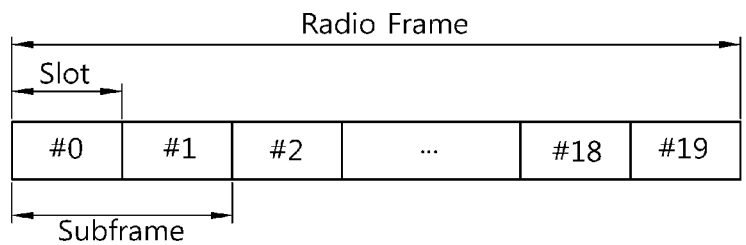

[Fig. 4]
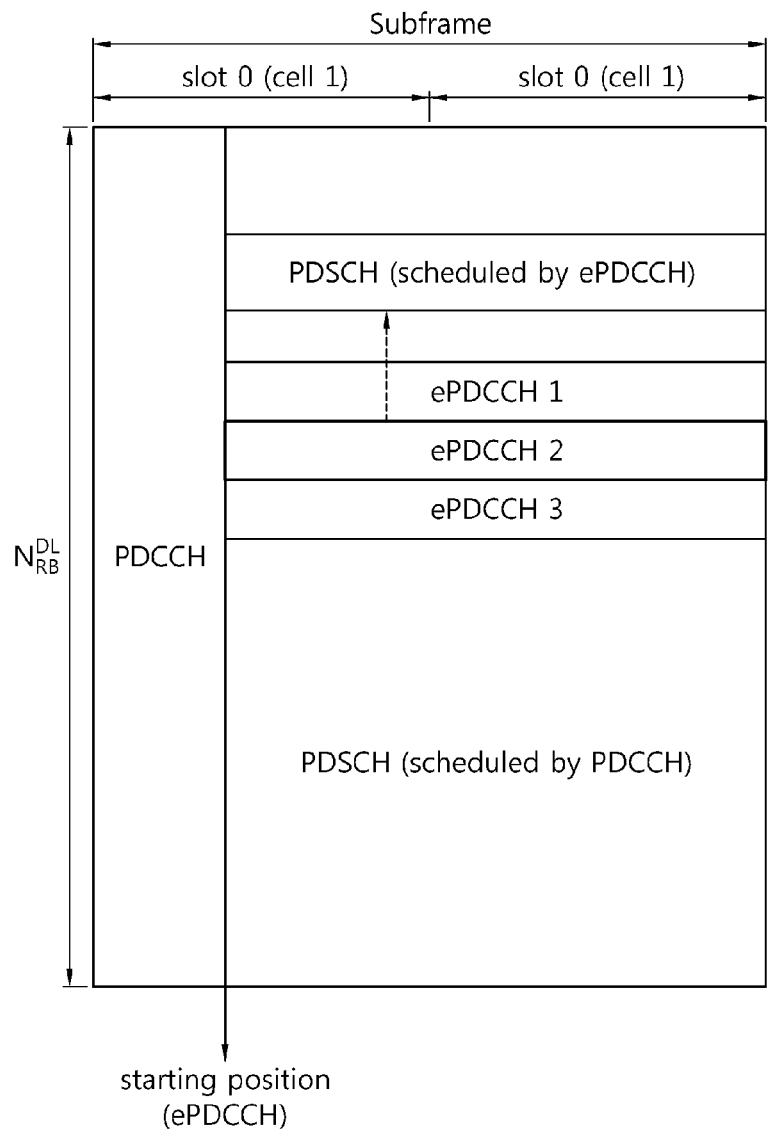
[Fig. 5]
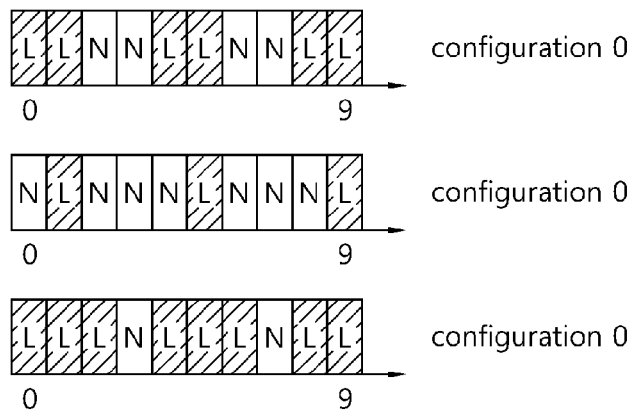

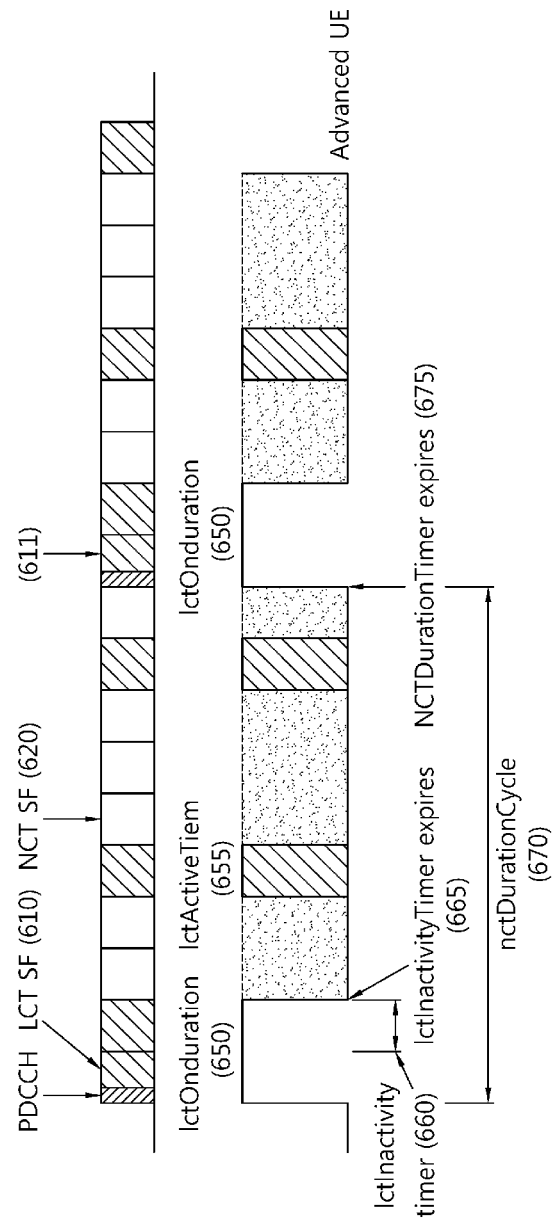
[Fig. 6]

[Fig. 7]
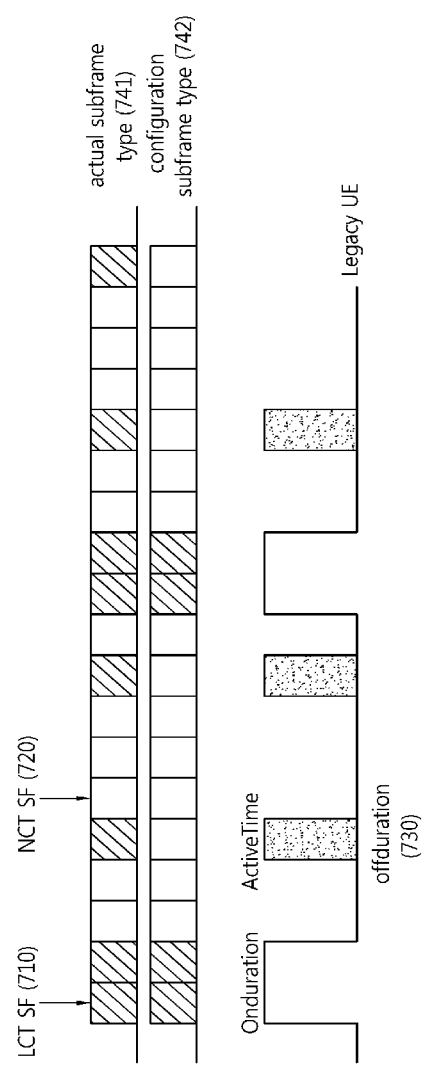

[Fig. 8]
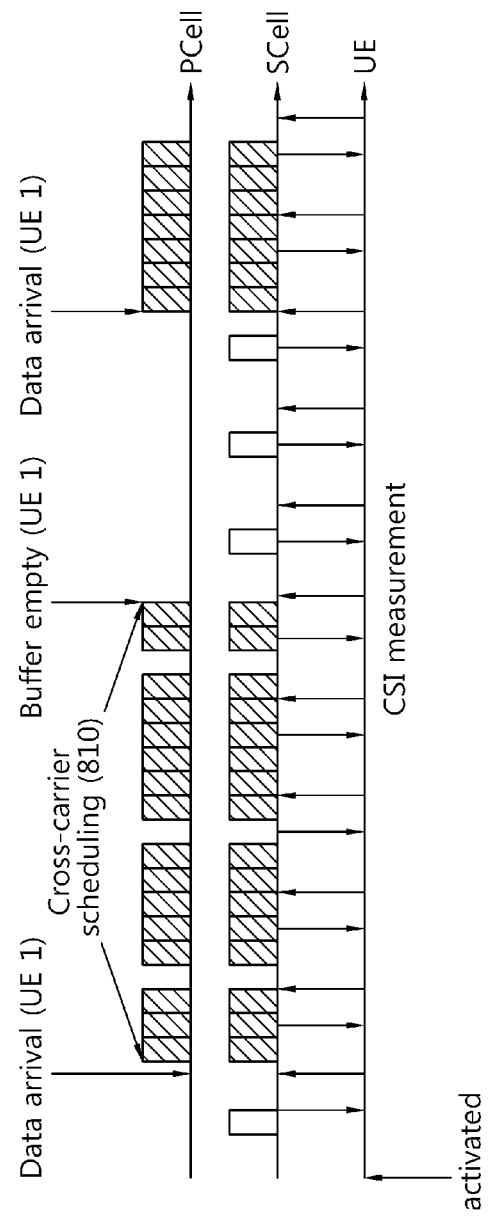

[Fig. 9]
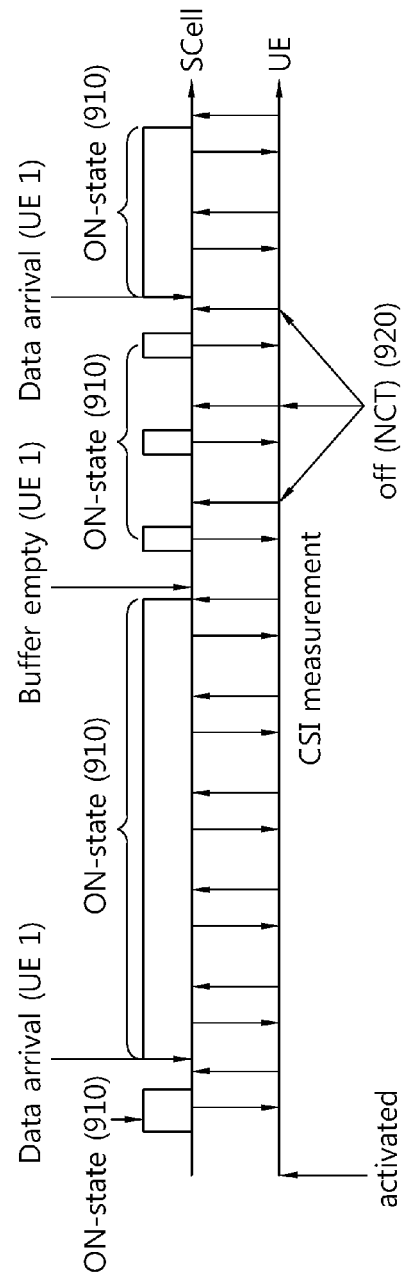

[Fig. 10]
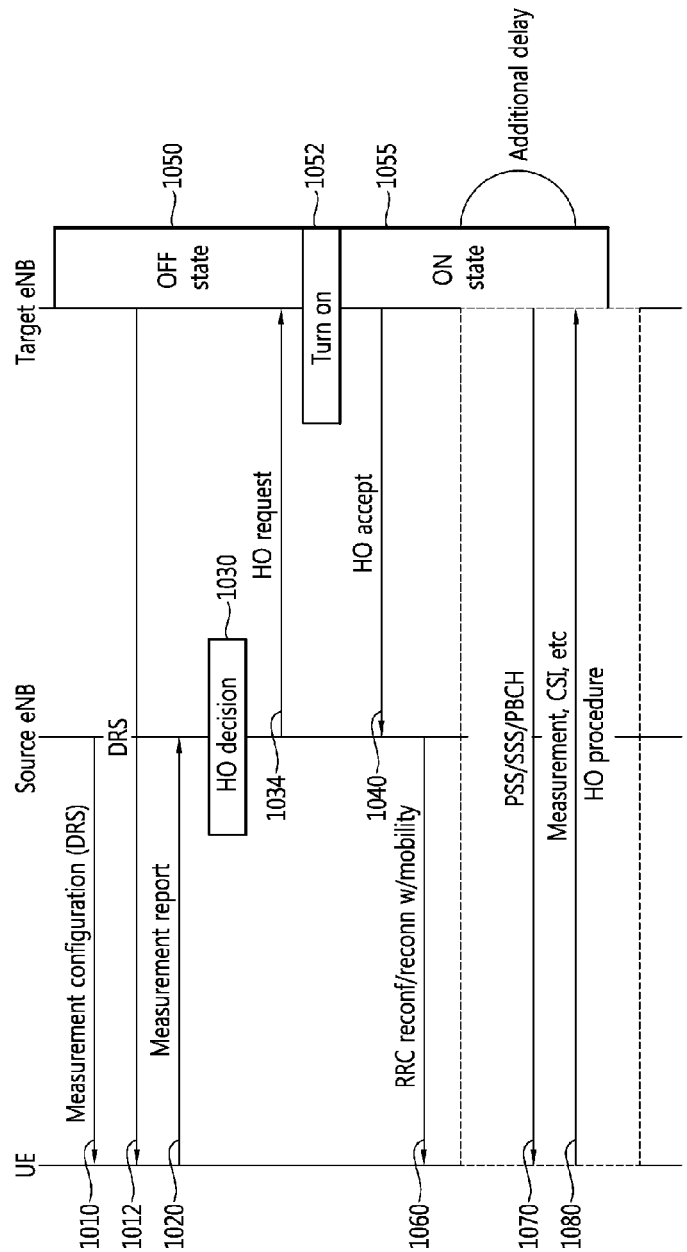
[Fig. 11]
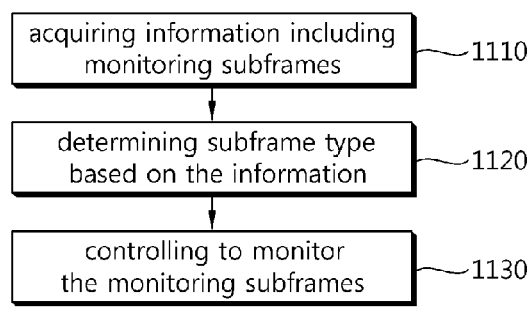

[Fig. 12]
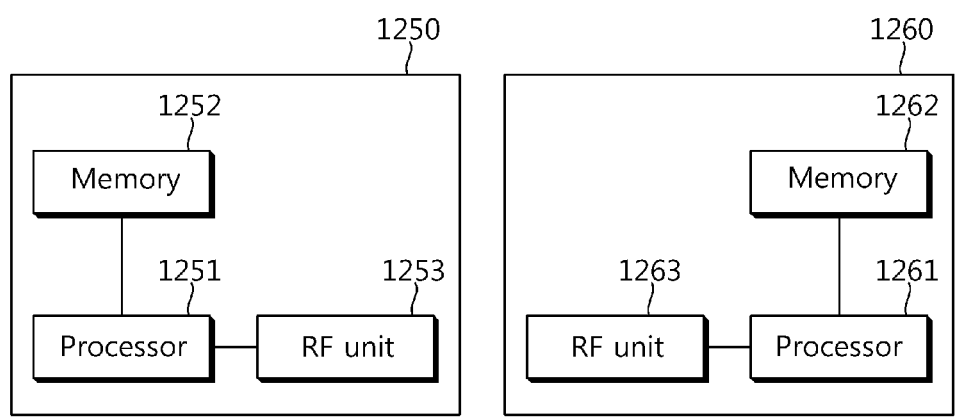

METHOD AND APPARATUS FOR CONTROLLING MONITORING TIMING IN WIRELESS COMMUNICATION SYSTEM

CROSS REFERENCE TO RELATED APPLICATIONS

This application is the National Phase of PCT International Application No. PCT/KR2014/003194, filed on Apr. 14, 2014, which claims priority under 35 U.S.C. 119(e) to U.S. Provisional Application No. 61/811,790, filed on Apr. 14, 2013, 61/898,451, filed on Oct. 31, 2013, and 61/955,194, filed on Mar. 18, 2014, all of which are hereby expressly incorporated by reference into the present application.

TECHNICAL FIELD

The present invention relates to wireless communications, and more particularly, to a method and apparatus for controlling monitoring timing in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users's demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment needs to be defined. The efficient operation includes proper monitoring and synchronization timing for small cells and macro cell.

DISCLOSURE OF INVENTION

Technical Problem

The present invention provides a method and apparatus for performing synchronization in a wireless communication system.

The present invention also provides a method and apparatus for controlling monitoring timing in a wireless communication system.

Solution to Problem

In an aspect, a method for controlling monitoring timing in a wireless communication system is provided. The method may include acquiring information including a monitoring subframe configuration, which is set for a first subframe in which at least one of control and reference signal is present, and a second subframe in which the control and reference signal are not present within a radio frame; determining monitoring subframes of a cell based on the information; and controlling to monitor the first subframe and the second subframe according to the monitoring subframes.

In another aspect, a wireless device for controlling monitoring timing in a wireless communication system is provided. The wireless device comprises: a radio frequency (RF) unit for transmitting and receiving a radio signal; and a processor operatively coupled to the RF unit, wherein the processor is configured for: acquiring information including a monitoring subframe configuration, which is set for a first subframe in which at least one of control and reference signal is present, and a second subframe in which the control and reference signal are not present within a radio frame; determining monitoring subframes of a cell based on the information; and controlling to monitor the first subframe and the second subframe according to the monitoring subframes.

Advantageous Effects of Invention

The proposed embodiment supports more efficient monitoring timing and synchronization with dynamic coverage by small cell and macro cell conditions. Especially, the proposed embodiment supports to control monitoring timing with distinction of cell reference signals (CRS) in subframe or no-CRS in subframe, in a small cell and a macro cell environment.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows an example of monitoring subframe configuration which the present invention is applied.

FIG. 6 and FIG. 7 show examples of monitoring subframes with active time according to carrier type which the present invention is applied.

FIG. 8 and FIG. 9 show examples of on/off duration which the present invention is applied.

FIG. 10 show examples of eliminating delay time for a cell type switch which the present invention is applied.

FIG. 11 shows a flow chart of controlling monitoring timing which the present invention is applied.

FIG. 12 shows a block diagram showing a wireless communication system according to an exemplary embodiment of the present invention.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) explains. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE s monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with the changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain. The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future commination system including a new type of carrier as shown in FIG. 4. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted.

For this next LTE system or enhanced communication system, this proposed embodiment provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. More details, this invention considers cases where cell-specific RS used for tracking and the Radio Resource Management (RRM) measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This proposed embodiment also supports an efficient transmission within a small cell cluster. More specifically, a dual connectivity for data flow and macro/small cell carrier-aggregation (CA), inter-site CA, or UE is connected to a small cell which belongs to a small cell cluster assuming a dense small cell deployment is supported. This proposed embodiment also discusses techniques to handle ICIC (Inter-cell interference coordination) in small cell scenarios and propose a new cell selection criteria. The scenarios considered in this invention mostly assume that macro and small cell layer use different frequency such as 2.6 Ghz and 3.5 Ghz respectively and small cell layer has wide band carriers such as 5×20 Mhz consecutive carriers. This invention thus mainly focuses on the interference coordination among small cells rather than between macro and small cell layer.

As described, this proposed embodiment may suggest that unnecessary cell-specific signals can be reduced to minimize the interference in a specific resource; the specific resource can be defined with a predetermined time or band; it includes a concept of subcarrier.

Hereinafter, this embodiment shows that a subframe which does not carry cell specific RS (CRS) can be called a New Carrier Type (NCT, new, non-CRS) subframe as an example. For explanation, the NCT subframe can be used as a term. The term can be changed and called according to the new system with a new name. The NCT downlink subframe can be defined as the followings, which is data demodulation/control channel demodulation in the NCT subframe is based on DM-RS regardless of transmission mode that the UE is configured with, also control channel demodulation in that subframe is based on DM-RS regardless of transmission mode that the UE is configured with. A CRS may not be transmitted, instead, tracking RS or other RS may be transmitted to aid time/frequency tracking of the UE. Legacy PDCCH may not be present in the NCT subframe. A UE may monitor EPDCCH if EPDCCH is configured to monitor in those subframes. Otherwise, a UE may not monitor any downlink control channel in NCT subframes. Optionally, UE may still expect to receive discovery signals in NCT subframes. Also, legacy PHICH as well to handle PHICH, either a UE is assumed as it monitors PCell PHICH (or MeNB PHICH or scheduling cell PHICH) or EPHICH is assumed in the NCT subframes. Or, a reference TDD DL/UL configuration can be given which will be used for PHICH resource for uplink subframes. In other words, according to the reference TDD DL/UL configuration, some PHICH may be available for uplink transmissions at certain subframes. However, this would not address all the uplink transmissions if FDD is used. A Legacy PCFICH is not present in NCT subframe.

Furthermore, an uplink subframe can be treated as the NCT subframe. In terms of a NCT uplink subframe, the usage can be two-folds. First is to use that as the NCT downlink subframe which has the above characteristics, or it can be used for an uplink subframe. If it is used for an uplink subframe, the characteristics of an NCT uplink are as follows. The NCT uplink is associated with a downlink including a scheduling downlink subframe or an Ack/Nack transmitting downlink subframe, it can be set a NCT type. Power control for PUSCH, PUCCH of the NCT uplink is determined based on power control commands transmitted in the NCT downlink subframes. More specifically, PUCCH may not be present in the NCT uplink subframe. Thus, if corresponding downlink, for example, in FDD, n+4$^{th}$ uplink will correspond to n-th downlink subframe is legacy carrier type, HARQ-ACK may be transmitted via PUSCH or a reference TDD DL/UL HARQ-ACK timing can be configured such that HARQ-ACK for the legacy carrier type transmission can be transmitted in PUCCH-available uplink subframe (i.e., legacy uplink subframe).

When advanced UEs which are followed by Rel-12 version in LTE system consider only accessing a carrier performing TDM between a legacy carrier type (LCT) subframe and new carrier type (NCT) subframe, rather semi-static approaches of dividing LCT and NCT subframe type can be considered. For this, this proposed embodiment shows prefix NCT-capable subframes, including that subframe #0/#5 are fixed for LCT and others are categorized in to NCT-capable subframes. The actual NCT-capable subframe configuration similar to MBSFN subframe configuration can be given by SIB or higher layer signaling. In terms of prefixing NCT capable subframes, non-MBSFN-capable subframes may be assumed as LCT regardless of configuration.

Or, SIB transmission or higher layer signaling of the NCT subframes may be defined. Each cell may advertise NCT subframe configurations via SIB or RRC signaling. PRACH subframe associated with these NCT subframes for RAR transmissions may not be used for PRACH transmissions which is only case for contention-based PRACH. However, since RAR timing is flexible, unless NCT subframes are consecutive for more than a few subframes, avoiding PRACH transmission may not be necessary. In other words, as long as RAR can be transmitted within RAR window, PRACH restriction would not be needed. If PRACH configuration may not be able to avoid the uplink subframes where RAR timing subframes are NCT subframes. If some paging-capable subframes are configured as the NCT type, a UE may assume that those subframes would not deliver paging. A UE may further assume that MBSFN subframe will not be assumed in NCT subframes. However, it does not mean that MBMS cannot be delivered in those subframes.

When a UE is configured with EPDCCH set(s), it assumes that subframes configured to monitor EPDCCH are NCT-capable subframes, it can be read as that NCT-capable subframes can be set per EPDCCH configuration. However, it is further notable that if CRS is present in that subframe, a UE may not assume that subframe is NCT-capable subframe. Using this option, a UE can be configured with EPDCCH set at SCell configuration or attaching assisting eNB carrier. If EPDCCH set configuration is not given, a UE shall assume SF#0 is LCT type and may assume other subframes are NCT type.

By either via SIB or higher layer signaling, reference TDD configuration where downlink subframe is assumed as the LCT type can be also given. For example, if a reference TDD configuration is given to FDD carrier, downlink subframes in TDD UL/DL configuration are assumed as LCT and others will be assumed as NCT. For TDD, downlink subframes in both SIB-ed UL/DL configuration and the reference UL/DL configuration can be assumed as the LCT and other subframes will be assumed as the NCT. In terms of handling HARQ-ACK, the NCT subframes are assumed that UE will monitor only EPDCCH. When this occurs, paging subframes where the NCT is configured would not be used for paging transmission or any SIB or CSS transmission. It is however noted that special subframe in TDD DL/UL configuration can be considered as downlink subframe. Thus, DM-RS pattern and any special treatment applied in special subframe are not applicable in this case. This configuration is used only to identify LCT type subframes and the associated HARQ-ACK timing if applicable. If this is applied, HARQ-ACK transmission may also follow TDD DL/UL configuration for LCT type subframes where NCT subframes may use separate HARQ-ACK timing or operate separately from LCT type subframes. Or, the DL/UL configuration may be only used for determining subframe type (and thus determining CRS presence). In this case, uplink subframes corresponding to downlink in the configured DL/UL subframes may assume PHICH will not be transmitted and thus PHICH-less operation is assumed. Or, PHICH may be transmitted from PCell or scheduling cell or EPHICH.

Meanwhile, a discovery signal can be used, if discovery signal is transmitted by a carrier, it can be also assumed that subframe transmitting the discovery/measurement signals are LCT and other subframes are NCT. In this case, transmission of SIB and other CSS data may be aligned with LCT subframes. To support time/frequency tracking, it can be further assumed that subframes transmitting time/frequency tracking RS can be considered as LCT and others are NCT.

Further, this assumption may be applicable only to carriers which are configured as SCells or carriers for assisting eNBs. In that case, it can be further assume that the configuration of subframe type may be given to UE via signaling such as RRC. In terms of UE behavior in NCT subframe and LCT subframe, a UE may not expect to receive any other signal except for discovery signals or measurement signals in NCT subframe according to its configuration. It may assume that CRS may be present in LCT subframes, whereas it would not assume that CRS will be present in NCT subframes.

In NCT-capable subframes, unless in those subframes UE may expect to receive CSS, it can assume the subframe type is NCT. In NCT, a UE expects to read EPDCCH if needed. In DRX as well, a UE can monitor either PDCCH or EPDCCH depending on its subframe type or configuration for its USS. For CSS, a UE monitors PDCCH in LCT subframes. Furthermore, a UE is not expected to perform measurement (RRM, RLM) on NCT subframe unless it is configured otherwise. Alternatively, a UE may be configured with measurement such as RRM only in NCT subframes regardless of the configuration of LCT/NCT subframes. If semi-static change of NCT and LCT type occurs, a UE may not perform RRM or perform different RRM based on discovery signal in NCT duration. To support a legacy UE or advanced UE behaving as if legacy UE or minimizing specification impact, it can be considered to multiplex legacy carrier type subframe and new carrier type subframe. A multiple approaches of multiplexing or frame type can be considered as follows.

If this approach is used for advanced UEs, advanced UE should assume that measurement signal will not be available in DRX cycle not in on-duration, active Time, or LCT-on-duration. Thus, measurement subframes will be restricted to active subframes according to DRX cycles. It is expected that SIB transmission will be limited to LCT subframes.

FIG. 5 shows an example of a monitoring subframe configuration which the present invention is applied.

Referring to FIG. 5, a monitoring subframe configuration is set with a TDM type within a radio frame. An example is {LLNNLLNNLL}, where 'L' indicates legacy carrier type and 'N' indicates new carrier type. A legacy UE is set to operate Discontinuous Reception (DRX) operation in N subframes. In TDD configuration, separate configuration can be given for subframe type and UL/DL configuration regarding the monitoring subframe configuration. For example, L/N configuration 0 with UL/DL configuration 0 as a monitoring subframe configuration 0 indicates that 5th uplink is legacy carrier type and 3rd and 4th uplink is new carrier type. Or, combined combination can be defined as well. Also the TDM can be configured in almost blank subframes (ABS)-configuration level. In other words, a similar configuration to ABS configuration can be used to configure TDM between LCT and NCT. The difference from ABS configuration is that the configuration of LCT/NCT is indicated to the UE.

Similar to ABS, either only legacy subframe is indicated or new carrier subframe is indicated using a bitmap. More details, ABS Patterns of FDD and TD-LTE are different. Even in TDD, ABS Patterns of different TDD configuration are also different. The ABS pattern is indicated by bitmap. For FDD, 40 bits (4 radio frame periods), TDD Configuration 1~5, 20 bits (2 radio frame periods), TDD configuration 0, 70 bits (7 radio periods), TDD configuration 6, 60 bits (6 radio periods). If legacy subframe indication is used, the associated uplink will be legacy carrier type even if bitmap is not indicated as such. For example, in FDD, n-th subframe is LCT subframe, n+4-th subframe at uplink is LCT subframe. Other not indicated subframes are assumed to be NCT.

Further, a TDM using starting offset and duration and period can be used for the monitoring subframes. FIG. 6. The FIG. 6 and FIG. 7 show examples of monitoring subframe configuration having active time of a carrier type which the present invention is applied.

Referring to FIG. 6, it is another approach to configure TDM is similar to DRX configuration using starting offset, duration and period. In this case, either new carrier type can be started any time and continue certain time. Similar to DRX, an advanced UE first attempts to decode LCT subframe by locating PDCCH (610) or CRS. If lctInactivityTimer expires, i.e., no PDCCH or CRS is found for lctInactivityTimer duration (665), it assumes that NCT subframe type will be used for the nctDurationTimer (670). It attempts to read PDCCH or decode CRS in onDurationTimer in every TDM cycle.

As described, the advanced UE controls that the LCTonDuration is active at specific subframes (650) by locating PDCCH (610), then the UE checks LCT-InactivityTimer (660) and when the LCT-InactivityTimer expires (665) so that the UE does not need to monitor PDCCH in the rest subframes during nctDurationCycle which are assumed to the NCT subframe type (670). When an nctDurationTimer expires, the UE check LCT subframes (611) to be llocated the PDCCH based on the TDM cycle.

To be more generic to handle a case when a UE cannot assume to PDCCH contained subframe (i.e., LCT subframe) unless PDCCH is scheduled to itself, the UE can read PCFICH or CRS instead of locating the PDCCH. If it can successfully decode PCFICH or CRS, it is considered that the subframe carries PDCCH and thus it is assumed as a legacy subframe. If there is no PCFICH located even though CRS is transmitted, that subframe can be assumed to be 'inactive' subframe which is used to transit between LCT and NCT. This embodiment notes that a starting symbol of ePDCCH in the inactive subframe follows the LCT configuration even though it does not carry PDCCH. When an advanced UE detects PCFICH successfully in n-th subframe, it shall assume that n+4, n+8, . . . are LCT subframes as well even though it is in nctDuration (i.e., subframe type is configured to NCT).

In other words, even in period configured with NCT type, if a legacy UE shall be supported in certain subframes, those subframes are transmitted with LCT type. To mitigate the PCFICH reliability issue (where UE may not successfully decode PCFICH even though it has been transmitted), lctInactivityTimer may be equal or larger than 2 msec. In NCT duration, UE would not expect to receive PBCH. It is however feasible to receive DM-RS based PBCH or any other cell-broadcast channel which may contain system information such as MIB or SIB. Or, a UE may assume that PBCH carrying subframes are LCT subframe even though it is in nctDuration. A UE may be informed with paging configuration used by legacy UEs so that those paging subframes (702) can be assumed as LCT subframe even in nctDuration. An example of a legacy UE with monitoring subframe configuration similar to DRX configuration is shown in FIG. 7.

This embodiment supports to configure LCT subframes only which can carry PDCCH or ePDCCHs. Other subframes may carry only PDSCH or ePDCCHs if configured.

This can be done via EPDCCH set configuration as well. If cross-subframe scheduling is used, DCI scheduled in LCT subframes can define the carrier type where PDSCH is transmitted. For example, if n-th LCT subframe schedules PDSCH for n+4-th subframe with NCT indication, a UE can assume that the PDSCH is scheduled in n+4-th subframe with NCT SF type, i.e., a PDSCH starting symbol is zero and data demodulation is performed based on DM-RS. This can be configured per ePDCCH set where each ePDCCH can be configured with carrier type and transmission mode.

Further, another approach is to use PCFICH-like signaling which can be placed in 4th OFDM symbol or the last OFDM symbol to avoid potential collision with PDCCH or other legacy signals. Either 0 or 1 can be indicated for LCT or NCT respectively. To efficiently determine whether the presence of CRS or tracking RS is existed or not, this indication may be used for the successive subframe instead of applying to itself. In other words, if 0 is indicated in n-th subframe, n+1-th subframe in FDD is assumed to be LCT. In TDD, the next downlink subframe type is determined by this indication and the type of uplink is determined by associated downlink subframe type. To handle wake-up UEs from DRX, a UE shall assume LCT type at the first downlink subframe and attempt to decode CRS and other legacy signals. At least, it shall read LCT/NCT type indication signal to determine the next subframe's type.

Or, another approach is to assume all subframe types are MBSFN subframes for advanced UEs. Enhanced MBSFN (eMBSFN) subframes can be considered as 'blank subframe' where PDSCH can be transmitted. In other words, according to MBSFN configuration, advanced UE shall assume non-MBSFN subframes will carry CRS at least one or two OFDM symbols and MBSFN subframes may not carry CRS at all which is called eMBSFN. In non-MBSFN subframes, CRS transmission in the rest of OFDM symbols (3-13) can be determined by reading PDCCH/PCFICH. For legacy UEs, non-MBSFN subframes can be used with DRX. Another approach is to assume that all MBSFN subframes or MBSFN-configurable subframes are NCT type subframes. Other subframes can be either NCT or LCT per radio frame. When a radio frame is used for NCT as a whole, PBCH is not detected in the subframe #0 or a specific field can be used to indicate the type of radio frame.

Also, another approach is to assume that ABS subframes are NCT type subframes which can be used among cells via X2 signaling. The information can be used to determine subframe shift or deciding the subset of NCT type and LCT type similar to ABS configurations.

This embodiment shows a signaling of those subframe types as the monitoring subframe configuration, three signaling ways can be considered. Firstly, a PBCH or SIB can be used; a LCT and NCT SF configuration can be broadcasted by PBCH or SIB. Or, higher layer signaling as RRC signaling or paging can be used, or, dynamic signaling with DCI or other signaling can be used to change the subframe type.

When NCT and LCT subframe are configured, this embodiment further shows that other legacy channels and different type of subframes to be handled. For MBSFN subframe, MBSFN subframe configuration broadcasted by SIB can be limited to be applicable to legacy UEs only. In other words, an advanced UE may not assume those subframes are used for MBSFN subframes unless another eMBSFN subframe configuration is given. In other words, if there is eMBSFN subframe configuration broadcasted by SIB or other higher layer signaling, it shall override the MBSFN configuration for advanced UEs. eMBSFN subframe may not carry any CRS and PMCH may start from OFDM symbol 0. Or, if eMBSFN subframe is used carrying PDSCH, it can be started with OFDM symbol 0 as well. In MBSFN subframe configured for legacy UEs, it can follow the design of legacy MBSFN subframe, i.e., one or two OFDM symbols used for PDCCH and CRS will be present in one or two OFDM symbols. In NCT duration, i.e., subframe type is configured as NCT in the duration; if legacy MBSFN subframe is configured, and then advanced UE shall assume that type of those subframes are for legacy carrier type instead of new carrier type.

In NCT duration, a paging subframe for a legacy UE shall be assumed to be legacy carrier type. Alternatively if NCT SF is given by SIB/PBCH or by hand-over commands and RRC signaling, a UE can assume paging will not be transmitted in those NCT subframes. For this, either the bitmap of legacy paging subframes can be higher-layer signaled to advance UEs or paging configurations for legacy UEs are higher layer signaled to legacy UEs or a set of prefixed paging configuration is reserved for legacy UEs in NCT/LCT multiplexing mode. To support this, an indication whether a set of paging configuration is used for legacy UEs is given to advance UEs via higher layer signaling or SIB. Also CRS-based PBCH is not transmitted. Instead, DM-RS-based PBCH can be transmitted.

For SIB transmission, legacy SIB transmission in NCT duration is not assumed to be present. Exceptionally, if SIB update is triggered, then NCT duration may be terminated and reconfigured to LCT duration.

When NCT duration is configured, tracking RS transmission may be assumed to be every 5 msec if semi-static TDM between NCT and LCT is used. If LCT subframes are sufficiently frequent, this may not be necessary as tracking using CRS transmitted in LCT subframes would be sufficient. If LCT and NCT are multiplexed within a radio frame, tracking RS may not be transmitted in NCT subframe type at all. PHICH may not be transmitted in NCT duration except for subframes configured for legacy carrier type. For PSS/SSS, unless it is configured to be dormant or inactive state, even in NCT duration, PSS/SSS can be transmitted. Alternatively, if NCT subframe is considered as 'off' state, it can be assumed that legacy signals will not be present in NCT subframe. Only discovery/measurement signals and/or EPDCCH/PDSCH may be transmitted in NCT subframes.

Furthermore, this invention shows that other issues to handle multiplexed LCT and NCT types are. In TM configuration, TMs configurable to NCT subframe types are different from TMs for LCT. A separate TM can be configured for NCT and LCT SF type. In NCT duration, if LCT subframe type is used to support legacy UEs, either the TM configured for NCT is used or TM configured for LCT can be used. For advanced UEs, it is desirable to use TM configured for NCT in NCT duration regardless of actual subframe type used.

A separate EPDCCH set can be configured for different type of subframes. Similar to two virtual cells one with legacy type subframes and the other with NCT subframes, two EPDCCH sets can be configured for each type of subset of subframes respectively. Or two EPDCCH as a whole may be configured where each EPDCCH set is associated with either NCT or LCT. In NCT duration, if LCT SF is used, EPDCCH may not be used if it is not configured to monitor EPDCCH in that subframe. If LCT and NCT subframe type coexist, DM-RS based PBCH may not exist unless it is indicated by higher layer signaling otherwise. SI-RNTI, P-RNTI, etc. may be also limited to LCT SF only such that NCT SFs may not need to support EPDCCH CSS or downlink common signaling.

A separate CSI-RS configuration can be given to LCT subframes and NCT subframes. Two CSI-RS configurations with different configuration index can be given where each CSI-RS resource is associated with either LCT or NCT. In NCT duration, even if LCT SF exists and CSI-RS presents in that subframe, CSI-RS resource configured for NCT SFs is assumed in that subframe. The reason of having two CSI-RS configurations is to allow flexible resource configuration used for interference measurement and so on in those NCT subframes.

Similar to CSI-RS configuration, a separate IMR configuration can be given to the LCT and NCT subframes. Moreover, the set of CSI-RS configurations and IMR configurations usable for LCT and NCT respectively can be different.

Two different DM-RS patterns can be used for LCT and NCT subframes. For LCT, legacy DM-RS pattern is assumed unless it is configured otherwise. For NCT subframes, one or more DM-RS patterns can be configured for normal and special subframes. Furthermore, resource mapping and antenna mapping for EPDCCH DM-RS in NCT duration or NCT subframes can be configured separately or different from a legacy pattern which can be pre-fixed. This applies to uplink as well.

In downlink power control related parameters, separate DL power control parameters such as PA can be configured for NCT subframes. The downlink power control parameters may include Tracking RS bandwidth, TRS boosting, DM-RS boosting, CSI-RS boosting, Antenna mapping for transmit diversity scheme, transmit power, also power ratio between CRS or TRS and PDSCH, also power ratio between PDSCH and CSI-RS.

A set of LCT and NCT subframe configuration information exchange among cells: similar to ABS signaling or a new backhaul signaling can be used to exchange the list of NCT subframe configurations so that other neighbor cells use the information for CRS/PSS/SSS/PBCH cancellation and other inter-cell interference coordination mechanisms. The information can be transmitted along with dormant/inactive state information so that other neighbor cells can perform necessary scheduling to minimize the interference. The number of legacy UEs supported in each small cell can be exchanged as well so that the small cell with low number of legacy UEs can hand-over those UEs to the neighbor cell or a cell with too many legacy UEs can hand-over legacy UEs to small cell with low load and small number of legacy UEs. The information about loading shall be exchanged along with the number of legacy and advanced UEs that each cell supports. The fraction of LCT type and NCT type SF can be exchanged among cells as well.

A separate PRACH configuration can be broadcasted which are used for legacy UEs and advanced UEs respectively. If there are many advanced UEs, PRACH configuration for legacy UEs can be selected with long interval and thus less available RACH resource and vice versa depending on the potential legacy UEs. The separate of PRACH configuration for UEs can be used to determine the RAR and successive transmission between eNB and UE. Furthermore, PRACH for advanced UEs may include some other necessary information such as related to required bandwidth, etc so that eNB can perform early admission control.

Similar to CSI0 and CSI1 with ABS configuration, separate CSI measurement and feedback will be reported by UE for each type of subframes. Thus, candidate of valid downlink subframes for uplink CSI feedback is determined by the uplink subframe type. If it is NCT, only NCT downlink subframes are considered as valid downlink subframe and vice versa for LCT. If ABS is configured, ABS with NCT is blank subframe. Thus, totally four CSI measurement and feedbacks can be configured. In NCT duration, CSI measurement on LCT CSI-RS are not performed regardless whether LCT subframes present or not. This way, if time scale is long, the number of CSI process that UE shall maintain can be kept to two to support ABS and different subframe type.

PUCCH offset can be configured separately for LCT and NCT SFs. If TDD is used, HARQ-ACK can follow the TDD timing regardless of subframe type. Similar to downlink, uplink can have blank subframe for one CC which can be used for uplink transmission for different CC which can be used for another PCell or CC in different-site/eNB.

UL power control, TPC given in the downlink subframe associated to the uplink with the same type will be used to control power for uplink transmission. PRACH transmission, advanced UE can be configured with two PRACH configurations with one for legacy UEs and the other for advanced UEs. Depending on type of operation that advanced UE likes to perform, it can select either legacy UE PRACH configuration or advanced UE PRACH configuration. By default, eNB assumes that UEs using legacy PRACH configuration are legacy UEs (vice versa for advanced PRACH configuration). By signaling in PUSCH scheduled by RAR or other uplink signaling or capability signaling, the type can be changed.

Regarding inter-cell coordination to use legacy SF type, neighbor cells can coordinate using legacy SF type in TDM fashion or FDM fashion. It is assumed that TDM cycle between LCT and NCT is 1 second and the duration of LCT is 100 msec, then, LCT period within 1 second for a cell with cell ID C1 can be [100*(C1% 10), 100*(C1% 10+1)] based on cell ID so that neighbor cells can use LCT in different timeline. To support legacy UEs seamlessly, instead of using cell ID, each cell may use virtual cell ID to determine LCT duration and use the same cell ID and each legacy UE can be switched to other neighbor cell to support seamless transmission/reception. For example, cell1 uses LCT in [0, 99] and cell2 uses LCT in [100, 199], a legacy UE can be served by cell1 in [0, 99] and switched to cell2 and serviced in [100,199].

When NCT is not used, instead, LCT or blank subframe is used, enhancement in DRX configuration can be considered. One approach is to use DRX configuration used for in-device interference coordination such as retransmission-Timer=0 or longer DRX cycle or configure more flexible DRX cycle duration. With DRX, shortDRX cycle can be used with blank subframe where short DRX can be aborted if a UE detects CRS. Or, another timer can be configured similar to DRX timer where that timer expires, a UE shall assume legacy carrier type is used or a UE detects CRS, it shall reset 'crsActiveTimer' so that the UE shall attempt to read CRS for crsActiveTimer duration and starts blank subframe (or off cycle) where no transmission or CRS based PDSCH is not transmitted. By exchanging off subframes among neighbor cells, each cell may determine a set of subframes with reduced power and full power respectively (and also no power). When a reduced power subframe is used, this will be signaling to UE by higher layer signaling or DCI. With reduced power subframe, power boosting used for reference signals can be different from normal subframe with full power available.

As described, a subframe type can be classified to (1) LCT (2) NCT and (3) off where off subframe not carrying any signaling including PSS/SSS. The Off subframes are treated same as to NCT except that NCT subframe may carry DM-RS based PDSCH whereas OFF subframe may not carry any data transmission.

Furthermore, a dynamic cell on/off scheme in this embodiment is described. when a UE is configured with a SCell which performs on/off operation, to support fast scale on/off operation, a few mechanisms can be considered.

A cross-carrier scheduling based cell on/off is needed to define, since PCell may maintain its state as 'ON' regardless of data availability, using cross-carrier scheduling can be considered to dynamically on or off the cell. One example is to assume that SCell is "ON-state" only if cross-carrier scheduling DCI is scheduled via PCell or another scheduling cell. A UE may assume that SCell may not be "ON-state" in other subframes. To support UE's measurement regardless of cell state, in terms of RRM measurement, it may be assumed that discovery signal would be used for RRM measurement where restricted measurement set may be further configured in addition to discovery signal transmission configuration or a UE is configured with measurement timing configuration where a UE can perform measurement based on discovery signals. For CSI measurement, a UE may assume that measurement subframe set-like configuration is given for CSI measurement where a UE can assume that the subframe configured by the measurement subframe set will carry the measurement RS such as CSI-RS or CRS. Or, in terms of CSI feedback, a UE may assume that CSI feedback is needed if the cell is activated regardless of actual state of the subframe where CSI-RS or CRS for CSI feedback is transmitted. The set may be same to CSI0 where a UE assume that subframes configured in CSI0 are "ON-subframes" and thus transmit measurement RS. It is however feasible to assume that a separate configuration can be given to indicate the active subframes for measurement. When DRX is configured, a UE may wake up one of active subframes to measure CSI feedback if configured to do so. For RLM, a UE may wake up one of active subframes to perform RLM in DRX operation.

One example with cross-carrier scheduling based on/off operation is shown in FIG. 8. In this case, if CRS-based TM is configured, a UE may not be able to assume that CRS will be present in every subframe. It may be able to assume that only subframes with scheduled DCI or cross-carrier scheduled would have CRS. Thus, channel estimation using CRS over multiple subframes may not be feasible. Thus, overall data demodulation performance may be degraded. However, if DM-RS based TM is configured, this approach can be easily achievable. Thus, it can be further considered to apply this type of on/off operation only with DM-RS based TM is configured. In other words, a UE may be configured with 'Potential' SCell on/off operation by higher layer in that case a UE shall assume that CRS will be present only if scheduling DCI is present in the scheduling cell or PCell. Furthermore, a UE may assume that CRS will be present regardless of scheduling DCI if CRS-based TM such as TM4 is configured for SCell not to incur any performance degradation. In either way, a UE can assume that necessary measurement signals will be present for CSI measurement subframe set and/or discovery signal subframes and/or other configured measurement subframe sets such as restricted measurement set. Whether the fast cell on/off operation is applied in SCell or not can be higher layer configured to each UE. When cross-carrier scheduling is used, DRX operation is also aligned with Scheduling or PCell. Moreover, when fast cell on/off operation is applied, measurement may be performed only in configured measurement related subframes and/or discovery signal subframes. This is also achieved by defining a new TM such as a variation of TM9 or TM10 where if a new TM is used, DCI is cross-carrier scheduled and fast on/off operation can be used in the scheduled cell. It is however assumed that a UE uplink operation is not affected.

As shown in the example, SCell is assumed as 'active' whenever cross-carrier scheduling DCI is available at PCell or scheduling cell. Other subframes not used for neither data transmission nor measurement may be assumed as 'anactive' or 'off-state' subframes.

A MAC CE or dynamic signaling based on a mode switch can be used. When a UE is configured with a set of subframes used for CSI feedback either by measurement set or another configuration, a UE may assume that those subframes will be kept as ON unless the cell is deactivated or de-configured. In addition to those subframes used for measurement and thus ON-state, a UE may assume two separate ON-state operation: first type is continuous ON-state where subframes will be 'ON-state' for a time continuously, and thus a UE may be able to assume that continuous CRS transmission from eNB aligned with MBSFN configuration and the other type is intermittent ON-state where subframes not used for measurement may not be assumed as ON-state unless otherwise noted. To switch two modes, either MAC CE or dynamic signaling such as DCI 1C based dynamic indication can be used. Another approach is to utilize DRX-like configuration where a UE may assume that CRS or eNB transmission would occur only in 'ON-duration' or 'Active Time for downlink reception'. If the measurement subframes are aligned among UEs, DCI based broadcast to advanced UEs may offer better system operation. However, considering flexibility and UE-specific mode switch, MAC-CE based approach would be more appropriate. Of course, cell-common MAC CE can be also considered. Upon receiving a change indication, a UE shall assume that cell would be in different mode at k-th subframe afterwards.

In the indication such as MAC CE or DCI may carry the applicable timing information. The operation is similar to cell activation/deactivation procedure. Thus, this operation can be utilized by cell activation/deactivation procedure by changing the UE behavior when a cell is deactivated. Rather than disabling all the operations when the cell is deactivated, a few operations can be kept until the cell is de-configured. Currently, the followings are the UE behavior when a cell is deactivated. If the SCell is deactivated, it does not transmit SRS on the SCell, not report CQI/PMI/RI/PTI for the SCell, not transmit on UL-SCH on the SCell, not transmit on RACH on the SCell, not monitor the PDCCH on the SCell, not monitor the PDCCH for the SCell.

This invention proposes to continue reporting on CQI/PMI/RI/PTI for the SCell even though the cell is deactivated. Or, the CSI reporting will be continued after deactivation only if a UE is configured by higher layer to do so (e.g., by keepCQIafterdeactivation=TRUE). More specifically, only wideband CQI may continue or only aperiodic CSI reporting may continue. In this case, aperiodic CSI request will be triggered by other cell such as PCell as SCell a UE will not monitor PDCCH. For aperiodic CSI reporting as well, only wideband CQI can be reported.

Furthermore, eIMTA (Enhanced Interference Mitigation & Traffic Adaptation) based on/off operation is applied to this invention, the eIMTA is an enhancement to LTE TDD for DL-UL interference management and traffic adaptation, it supports dynamic TDD configuration. Also, it connects with eIMTA with dynamic TDD configuration as an example. The TDD UL/DL configuration for traffic adaptation is used by reconfiguration or HARQ scheme. Also interference mitigation with TDD UL/DL reconfiguration is used with UL power control. So another potential application of fast transition time cell on/off is to utilize eIMTA framework if TDD mode is used. When a UE is capable of performing eIMTA, to utilize dynamic cell on/off can be done via configuring dynamic TDD DL/UL configurations utilizing eIMTA framework. For example, a UE is configured with TDD DL/UL configuration #0 via SIB and is configured with TDD DL/UL configuration #5 as a DL-HARQ timing reference configuration. Then, only uplink #2 is a fixed uplink carrying PUCCH and other uplink subframes can be used either for flexible downlink or uplink subframe. To change the mode between two states of continuous ON-state or intermittent ON-state, a network can dynamically change DL/UL configuration from such as DL/UL configuration #5 to DL/UL configuration #0 where uplink subframes indicated by dynamic DL/UL configuration may be used for cell off operation where uplink transmission can be still feasible depending on the scheduling. This may not require additional specification work and can be used for fast time-scale cell on/off operation.

Similar approach can be applied to FDD, however, dynamic subframe change may cause HARQ-ACK timing change such as PHICH transmission where PHICH expected subframe should not be turned off such that a UE may be able to receive PHICH or a UE may operate without PHICH if the PHICH subframe changes to OFF state. Thus, it is desirable not to configure 'dynamic' on/off operation per radio frame. If needed, configuring TDD DL/UL configuration can be considered where HARQ-ACK timing and ACK/NACK piggybacking and mechanisms may follow TDD operation even though FDD operation. Particularly this would be useful when TDD-FDD CA is configured and on/off operation may be occurred for SCell. When FDD is a SCell, a UE can be configured with reference DL HARQ-ACK timing on FDD which will be used for HARQ-ACK timing reference configuration, further eIMTA can be applied to FDD operation where downlink and uplink may be performed separately.

For example, if dynamic DCI indicates TDD DL/UL configuration #2 for FDD (DSUDDDSUDD), a UE can assume that subframe #2/#7 will not be used for downlink transmission (and thus OFF-state). When FDD-FDD CA is configured, if eIMTA is applied for FDD SCell, a UE should be able to support FDD-TDD CA where all timing and HARQ-ACK transmission are assumed to follow FDD-TDD (FDD/TDD eIMTA) framework. More specifically, if eIMTA is applied for FDD, since subframes not configured as downlink would not be used for downlink subframe at all, all PHICH and self-scheduling timing needs to follow TDD as well. In other words, if a UE is configured with eIMTA-like operation for FDD as a SCell, the SCell downlink should be assumed as TDD configuration where uplink subframes in the configuration would be assumed as OFF subframes. For uplink transmission such as PUSCH, FDD-TDD CA framework timing/scheduling is used if FDD has a paired uplink frequency.

Besides, it can be further considered to allow aperiodic CSI triggering on deactivated or intermittent ON-state but configured SCells by aperiodic request. This can be done by configuring aperiodic CSI sets accordingly to include deactivated SCells. When a UE can perform aperiodic CSI on deactivated cells or in intermittent ON-state cells, it shall report CSI feedback on the cell. Otherwise, CSI feedback may be skipped or put predetermined value. A UE may not be able to perform CSI measurement if it is not ready or it has not been monitoring the carrier or in measurement gap.

Another potential enhancement is to add 'activation ready' command where a UE starts preparing activation of a SCell by starting CSI feedback. In this mode, a UE may not monitor downlink (e.g., PDCCH) yet, it may perform only CSI feedback if measurement is configured. Upon receiving an activation command, it can start monitoring of downlink control/data channels. More specifically, this activation ready command can be broadcast via cell-common signaling such as dynamic signaling or paging or cell-common broadcast mechanism.

Furthermore, the cell on/off supports mechanisms for a hand-over or a dual connectivity, it is shown in FIG. 10.

During hand-over procedure, in a case where eNBs are not aligned in terms of frame/subframe boundary and SFN, a UE may have to determine frame boundary and SFN by acquiring PSS/SSS of frame boundary and acquiring PBCH. In dual connectivity, the same situation may occur as well. Now that, a UE performs measurement using discovery signals which may not have a tight relationship with frame boundary, there may be no explicit means for a UE to find frame boundary or SFN. Thus, to omit legacy signals during off-state, additional support on hand-over and/or dual connectivity may be necessary.

When hand-over or dual connectivity procedure is performed, unless DRS is used to infer frame boundary and SFN, a UE may have to read PSS/SSS and PBCH when the target cell becomes active to acquire frame boundary and SFN. Thus, this invention proposes the following alternatives to eliminate this additional delay indicating frame boundary timing offset and/or SFN offset from source eNB before hand-over so that a UE may not need to acquire the timing information of frame boundary and/or SFN. This may require both eNBs know the timing information of each other. It includes that DM-RS (Demodulation Reference Signals) may carry SFN information and transmitted in a fixed subframe so that frame boundary can be identified by the locating DM-RS. For example, DM-RS will be transmitted in every 2nd subframe in each radio frame or over multiple subframes.

Also, to carry SFN information, DRS comes with PBCH or other data channel to convey the necessary information. Furthermore, at least a rough SFN can be indicated by DRS by fixing SFN where DRS is transmitted such as SFN % 4=0 transmits DRS. Even though a UE may not know the exact SFN, at least a rough information of SFN can be acquired by reading DRS. Or, transmitting PBCH during off-state, instead of transmitting PBCH every 10 msec, rather infrequent PBCH transmission can be also considered as the delay. In this case, if intermittent PBCH is transmitted in only SFN % 4=0 radio frame, there is no need to transmit all four PBCHs, and only one PBCH can be transmitted aligned with discovery signal interval. Further, another approach is to indicate the UE whether the network is tightly synchronized or not in indicating the synchronous state. Particularly in TDD, since the network may be synchronized, a UE may assume that SFN and frame boundary are aligned between source and target cell. This can be configured along with DRS related measurement configuration. When a UE is indicated with asynchronous state, the UE may have to acquire PBCH/PSS/SSS to acquire timing information.

FIG. 11 shows a flow chart of controlling monitoring timing which the present invention is applied.

Referring FIG. 11, a UE acquires information including a monitoring subframe configuration, which is set for a first subframe in which at least one of control and reference signal is transmitted, and a second subframe in which a discontinuous reception (DRX) on the control and the reference signal is performed within a radio frame; wherein the first subframe and the second subframe in the monitoring subframe configuration are changed according to a downlink (DL)/uplink (UL) configuration of a corresponding cell (1110). The first subframe and the second subframe's location in the radio frame are changed according to a dynamic configuration for traffic adaptation, herein the first subframe is the LCT, and the second is the NCT. Also the UE can be an advanced UE followed enhance system, when the UE is a legacy UE, it can configure the only the first subframe as LCT.

The UE can determine the monitoring subframes of a cell based on the information, it includes that the UE recognizes that a subframe type which is LCT or NCT (1120) and control to monitor the first subframe and the second subframe according to the monitoring subframes (1130). The UE checks the LCT subframe including that a cell specific reference signal (CRS) is transmitted in predetermined symbols, and the NCT subframe including that the CRS is not transmitted.

Also the UE can control to perform measurement in the LCT subframe and not perform measurement in the NCT subframe. Wherein the NCT subframe further includes; a subframe being that a downlink control channels including a PCFICH, a PDCCH, or a PHICH is not transmitted; a subframe being that ePDCCH, a discovery signal, or a Demodulation Reference Signal (DM-RS) is transmitted; or a subframe being that a power control parameters is configured less than the first subframe to control the interference between subframes. Further the UE can check different ePDCCH set based on the carrier type of the subframe and controls to monitor the subframe with a common search space (CSS) or a user-specific search space (USS) based on the ePDCCH set.

Herein the UE may check DRX information including a starting offset, onduration and cycle for a carrier type of a subframe; and determines whether a subframe is in the monitoring subframes or not, by controlling an active time and an offtime of the subframe based on the DRX information. Wherein the information further includes a subframe pattern including that 0 and 5th subframes are set for the first subframe and others are set for the second subframe in the radio frame; or bitmap information to indicate the first subframe and the second subframe with a predefined value. Herein the information is acquired via one of a radio resource control (RRC) message including a subframe configuration including bitmap information to indicate the first subframe and the second subframe, an almost blank subframes (ABS) configuration based on a different Time Division Duplex (TDD) configuration, or a DRX configuration including a starting offset, duration and period, for the monitoring subframes; a medium access control (MAC) message; or a system information message.

FIG. 12 is a block diagram showing a wireless communication system according to an embodiment of the present invention.

A BS 1250 includes a processor 1251, a memory 1252, and a radio frequency (RF) unit 1253. The memory 1252 is coupled to the processor 1251, and stores a variety of information for driving the processor 1251. The RF unit 1253 is coupled to the processor 1251, and transmits and/or receives a radio signal. The processor 1251 implements the proposed functions, procedures, and/or methods. In the embodiments of FIG. 2 to FIG. 11, the operation of the BS can be implemented by the processor 1251.

Especially, the processor 1251 may configure one or more cells with different frequencies, for this invention the processor 1251 configures the cells to support Semi-Persistent Scheduling, TTI-bundling, HARQ-ACK procedures. The processor 1251 may configure and transmit a configuration including a small cell as a relay node, the information related to the relay node (e.g., cell ID, scheduling information, etc) to the UE so that the UE can properly receive the data from the relay node. It also includes ACK/NACK subframe configuration for the data transmission.

Also the processor 1251 may configure synchronization information including a set of subframes in which a discovery signal or a synchronization signal is transmitted or not per radio frame, and a subframe pattern which is changed according to a downlink (DL)/uplink (UL) configuration of a corresponding cell, the subframe configuration includes bitmap information to indicate the LCT subframe and the NCT subframe is configured for the cells or shared the between the macro cell and one of the small cells to perform the synchronization. And then processor 1251 may configure the subframe pattern for monitoring a discovery signal or synchronization signal of performing a network sync-up.

When the processor 1251 configures the subframe pattern, the subframe pattern includes an offset between a cell to be set (a cell to be synchronized) and a cell to set (a reference cell as a sync cell), period of the a corresponding cell, or DRX information including a starting offset, onduration and cycle for a carrier type of a subframe so the UE determines whether a subframe is in the monitoring subframes or not, and controls an active time and an offtime of the subframe based on the DRX information.

The processor 1251 can configure cell on/off to save the UE's energy saving with DRX configuration of the subframe pattern having the LCT and NCT types, it can be also signaled to the UE to perform the better cell synchronization. The information of the subframe pattern having the LCT and NCT types is configured by RRC configuration, Scell configuration, or TM mode configuration. Or, when those configurations are already set in the node in UE, the information including an indication to operate a specific cell is indicated by L1 signaling.

The processor 1251 can perform a RACH procedure and data transmission via the selected subframe, also configure CRS or PSS/SSS each, the CRS patterns includes a start subframe, subframe set, and RB of the CRS with the RRC configuration in a radio frame. Further the processor 1251 may configure proper a dynamic TDD configuration for traffic adaptation.

The wireless device 1260 includes a processor 1261, a memory 1262, and an RF unit 1263. The memory 1262 is coupled to the processor 1261, and stores a variety of information for driving the processor 1261. The RF unit 1263 is coupled to the processor 1261, and transmits and/or receives a radio signal. The processor 1261 implements the proposed functions, procedures, and/or methods. In the embodiments of the FIG. 2 to FIG. 11, the operation of the UE can be implemented by the processor 1261.

Especially, the processor 126 may configure one or more cells with different frequencies, for this invention the processor 126 configures the cells to support Semi-Persistent Scheduling, TTI-bundling, HARQ-ACK procedures. The processor 1261 may configure and receive a configuration of serving cells including a macro cell and a small cell as a relay node, the information related to the relay node (e.g., cell ID, scheduling information, etc) supports that the UE can properly receive the data from the relay node of the small cell and the macro cell. It also includes ACK/NACK subframe configuration for the data transmission. The processor 1261 may also calculate ACK/NACK timing after receiving the data based on the ACK/NACK subframe configuration.

Also the processor 1261 may configure monitoring information including a set of subframes in which a discovery signal or a synchronization signal is transmitted or not per radio frame, and a subframe pattern which is changed according to a downlink (DL)/uplink (UL) configuration of a corresponding cell, the subframe configuration includes bitmap information to indicate the LCT subframe and the NCT subframe is configured for the cells or shared the between the macro cell and one of the small cells to perform the synchronization. And then processor 1261 may configure the subframe pattern for monitoring a discovery signal or synchronization signal of performing a network sync-up. For example, the monitoring subframe configuration is set for a LCT subframe in which at least one of control and reference signal is transmitted, and a NCT subframe in which a discontinuous reception (DRX) on the control and the reference signal is performed within a radio frame;

When the processor 1261 configures the subframe pattern, the subframe pattern includes an offset between a cell to be set (a cell to be synchronized) and a cell to set (a reference cell as a sync cell), period of the a corresponding cell, or DRX information including a starting offset, onduration and cycle for a carrier type of a subframe so the UE determines whether a subframe is in the monitoring subframes or not, and controls an active time and an offtime of the subframe based on the DRX information.

The processor 1261 can configure cell on/off to save the UE s energy saving with DRX configuration of the subframe pattern having the LCT and NCT types, it can be also signaled to the UE to perform the better cell synchronization. So the processor 1261 can checks a DRX information including a starting offset, onduration and cycle for a carrier type of a subframe; and calculate monitoring subframes whether a subframe is in the monitoring subframes or not, with determining an active time and an offtime of the subframe based on the DRX information. Also the information of the subframe pattern having the LCT and NCT types is configured by RRC configuration, Scell configuration, or TM mode configuration. Or, when those configurations are already set in the node in UE, the information including an indication to operate a specific cell is indicated by L1 signaling. So the processor 1261 can controls to monitor subframes and to check the LCT and NCT per subframe.

The processor 1261 can perform a RACH procedure and data transmission via the selected subframe, also configure CRS or PSS/SSS each, the CRS patterns includes a start subframe, subframe set, and RB of the CRS with the RRC configuration in a radio frame. Further the processor 1261 may configure proper a dynamic TDD configuration for traffic adaptation.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for monitoring one or more subframes in a wireless communication system, the method performed by a user equipment (UE) and comprising:
   acquiring information including a monitoring subframe configuration,
   wherein the monitoring subframe configuration is set for a first subframe in which a cell specific reference signal (CRS) is present, and
   wherein the monitoring subframe configuration is further set for a second subframe in which the CRS is not presented within a radio frame;
   determining monitoring subframes of a cell based on the acquired information;
   checking discontinuous reception (DRX) information including a starting offset, an on duration and a cycle for a carrier type of a subframe;
   determining whether the first subframe or the second subframe is in the monitoring subframes based on an active time and an off time of the first subframe and the second subframe,
   wherein the active time and the off time of the first subframe and the second subframe are determined by the DRX information; and
   if the first subframe or the second subframe is determined to be in the monitoring subframes, monitoring the first subframe or the second subframe.

2. The method of claim 1, further comprising:
   performing a measurement based on cell-common reference signals in the first subframe and performing a selective measurement based on discovery signals in the second subframe.

3. The method of claim 1, wherein the acquired information further includes:
   a subframe pattern including 0 and 5th subframes are set for the first subframe and other subframes that are set for the second subframe in the radio frame; or
   bitmap information to indicate the first subframe and the second subframe with a predefined value.

4. The method of claim 1, wherein the information is acquired via one of:
   a radio resource control (RRC) message including a subframe configuration including bitmap information to indicate the first subframe and the second subframe, or a period based configuration including a starting offset, a duration and a period, for the monitoring subframes;
   a medium access control (MAC) message; or
   a system information message.

5. The method of claim 1, wherein the second subframe further includes:
   a subframe for which a downlink control channel including a Physical Control Format Indicator Channel (PC- FICH), a Physical Downlink Control Channel (PDCCH), or a Physical Hybrid-ARQ Indicator Channel (PHICH) is not transmitted;

a subframe for which an enhanced Physical Downlink Control Channel (ePDCCH), a discovery signal, or a Demodulation Reference Signal (DM-RS) is transmitted; or a subframe for which a power control parameter is configured to be less than the first subframe.

6. The method of claim 1, wherein an enhanced Physical Downlink Control Channel (ePDCCH) set is checked based on the carrier type of the subframe, and the first subframe or the second subframe is monitored with a common search space (CSS) or a user specific search space (USS) based on the ePDCCH set.

7. The method of claim 1, wherein the first subframe and the second subframe in the monitoring subframe configuration are changed according to a downlink (DL)/uplink (UL) configuration with a dynamic Time Division Duplex (TDD) configuration for traffic adaptation.

8. The method of claim 1, wherein the first subframe and the second subframe in the monitoring subframe configuration are changed according to a downlink (DL)/uplink (UL) configuration of a corresponding cell.

9. The method of claim 1, wherein the first subframe and the second subframe in the monitoring subframe configuration are changed based on a presence of a physical downlink control channel (PDCCH) or a CRS, or based on a DRX configuration where a subframe that is not in DRX active time is considered as being in an OFF state.

10. A wireless device for monitoring one or more subframes in a wireless communication system, the wireless device comprising:

a transceiver configured to transmit and receive a radio signal; and a processor operatively coupled to the transceiver, wherein the processor is configured to:

acquire information including a monitoring subframe configuration, wherein the monitoring subframe configuration is set for a first subframe in which a cell specific reference signal (CRS) is present, and wherein the monitoring subframe configuration is further set for a second subframe in which the CRS is not presented within a radio frame;

determine monitoring subframes of a cell based on the acquired information;

check discontinuous reception (DRX) information including a starting offset, an on duration and a cycle for a carrier type of a subframe; and determine whether the first subframe or the second subframe is in the monitoring subframes based on an active time and an off time of the first subframe and the second subframe, wherein the active time and the off time of the first subframe and the second subframe are determined by the DRX information; and if the first subframe or the second subframe is determined to be in the monitoring subframes, monitor the first subframe or the second subframe.

11. The wireless device of claim 10, wherein the processor is further configured to:

checking the acquired information, wherein the acquired information further includes a subframe pattern including 0 and 5th subframes are set for the first subframe and other subframes that are set for the second subframe in the radio frame or bitmap information to indicate the first subframe and the second subframe with a predefined value, and wherein the information is acquired via one of:

a radio resource control (RRC) message including a subframe configuration including bitmap information to indicate the first subframe and the second subframe, an almost blank subframes (ABS) configuration based on a different Time Division Duplex (TDD) configuration, or a DRX configuration including a starting offset, duration and period, for the monitoring subframes;

a medium access control (MAC) message; or a system information message.

* * * * *